US00RE47343E

(19) United States
(12) Reissued Patent
Bando et al.

(10) Patent Number: US RE47,343 E
(45) Date of Reissued Patent: Apr. 9, 2019

(54) CORE FOR WIRE-WOUND ELECTRONIC COMPONENT, WIRE-WOUND ELECTRONIC COMPONENT, AND COMMON MODE CHOKE COIL

(71) Applicant: MURATA MANUFACTURING CO., LTD., Kyoto (JP)

(72) Inventors: Masahiro Bando, Nagaokakyo (JP); Takahiro Aoki, Nagaokakyo (JP)

(73) Assignee: Murata Manufacturing Co., Ltd., Kyoto-fu (JP)

(21) Appl. No.: 15/258,874

(22) Filed: Sep. 7, 2016

Related U.S. Patent Documents

Reissue of:
(64) Patent No.: 9,159,486
Issued: Oct. 13, 2015
Appl. No.: 14/331,562
Filed: Jul. 15, 2014

(30) Foreign Application Priority Data

Aug. 6, 2013 (JP) ..... 2013-162868

(51) Int. Cl.
*H01F 27/29* (2006.01)
*H01F 17/04* (2006.01)
(Continued)

(52) U.S. Cl.
CPC ..... *H01F 27/29* (2013.01); *B65H 75/06* (2013.01); *H01F 17/04* (2013.01); *H01F 27/28* (2013.01);
(Continued)

(58) Field of Classification Search
CPC .... H01F 27/29; H01F 27/292; H01F 27/2828; H01F 17/04; H01F 27/28; B65H 75/06
(Continued)

(56) References Cited

U.S. PATENT DOCUMENTS 6,472,969 B1 * 10/2002 Hanato ..... H01F 17/045 336/192
6,778,055 B1 * 8/2004 Wang ..... H01F 17/045 336/208
(Continued)

FOREIGN PATENT DOCUMENTS

JP H11-204346 A 7/1999
JP 2000-208331 A 7/2000
(Continued)

OTHER PUBLICATIONS

An Office Action; "Notification of Reasons for Rejection," issued by the Japanese Patent Office on Jun. 23, 2015, which corresponds to Japanese Patent Application No. 2013-162868 and is related to the present U.S. Patent Application; with English language translation.
(Continued)

*Primary Examiner* — Kenneth Whittington
(74) *Attorney, Agent, or Firm* — Studebaker & Brackett PC

(57) ABSTRACT

A core for a wire-wound electronic component. The core has a winding base to be wound with a wire, and flanges located at both ends of the winding base in an extending direction of the winding base. The flanges protrude from the winding base in a first direction perpendicular to the extending direction. Each of the flanges has a plurality of protrusions on a first surface at a side of the flange in the first direction. An inclined surface is provided to extend from the first surface of each of the flanges to a second surface of the winding base at a side of the winding base in the first direction.

8 Claims, 2 Drawing Sheets

(51) Int. Cl.
*H01F 27/28* (2006.01)
*B65H 75/06* (2006.01)

(52) U.S. Cl.
CPC ..... *H01F 27/2828* (2013.01); *H01F 27/292* (2013.01)

(58) Field of Classification Search
USPC ..... 336/65, 83, 192, 199, 208, 225
See application file for complete search history.

(56) References Cited

U.S. PATENT DOCUMENTS

| | | | | |
|---|---|---|---|---|
| 2004/0155745 | A1 | 8/2004 | Wang | |
| 2005/0237141 | A1* | 10/2005 | Hirai et al. | 336/83 |

FOREIGN PATENT DOCUMENTS

| | | | |
|---|---|---|---|
| JP | 2006-147728 | A | 6/2006 |
| JP | 2008-294472 | A | 12/2008 |

OTHER PUBLICATIONS

The First Office Action issued by the Chinese Patent Office on Jan. 28, 2016, which corresponds to Chinese Patent Application No. 201410379780.5 and is related to the present U.S. Patent Application; with English language translation.

* cited by examiner

CORE FOR WIRE-WOUND ELECTRONIC COMPONENT, WIRE-WOUND ELECTRONIC COMPONENT, AND COMMON MODE CHOKE COIL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[This application] *The present application is a reissue application under 35 U.S.C. § 251 of U.S. patent application Ser. No. 14/331,562, filed Jul. 15, 2014, now U.S. Pat. No. 9,159,486, issued Oct. 13, 2015, which* claims benefit of priority to Japanese Patent Application No. 2013-162868 filed Aug. 6, 2013, the entire content of which is incorporated herein by reference.

TECHNICAL FIELD

The present disclosure relates to a core for a wire-wound electronic component, a wire-wound electronic component, and a common mode choke coil, and more particularly to the shape of a flange of a core for a wire-wound electronic component.

BACKGROUND

As a conventional core for a wire-wound electronic component, a core for a common mode choke coil disclosed by Japanese Patent Laid-Open Publication No. H11-204346 is known. Such a core has flanges at both ends of a winding base, and each of the flanges is divided into two parts by a groove extending in a direction in which the winding base extends. External electrodes are provided on the respective parts of the flanges.

A wire wound around the core crosses the grooves while extending from the winding base to the external electrodes. Therefore, the parts of the wire crossing the grooves do not contact with the core and float in the air. Therefore, when a common mode choke coil using the core is mounted on a circuit board, if a foreign object is stuck between either of the flanges and the circuit board, the part of the wire crossing the groove will be pushed toward the bottom of the groove, which may cause wire disconnection.

SUMMARY

An object of the present disclosure is to provide a core for a wire-wound electronic component that can diminish the risk of wire disconnection, a wire-wound electronic component, and a common mode choke coil.

A first embodiment of the present disclosure relates to a core for a wire-wound electronic component, and the core comprises: a winding base to be wound with a wire; and flanges located at both ends of the winding base in an extending direction of the winding base and protruding from the winding base in a first direction perpendicular to the extending direction. Each of the flanges has a plurality of protrusions on a first surface at a side of the flange in the first direction. An inclined surface is provided to extend from the first surface of each of the flanges to a second surface of the winding base at a side of the winding base in the first direction.

A second embodiment of the present disclosure relates to a wire-wound electronic component, and the wire-wound electronic component comprises: the core described above; a wire; and external electrodes provided on the respective protrusions.

A third embodiment of the present disclosure relates to a common mode choke coil, and the common mode choke coil comprises: the core described above; a wire; and external electrodes provided on the respective protrusions.

The core for a wire-wound electronic component according to the first embodiment comprises flanges located at both ends of a winding base. Each of the flanges protrudes in a first direction perpendicular to the central axis of the winding base and has a plurality of protrusions on a first surface at the side of the flange in the first direction. An inclined surface is provided to extend from the first surface of each of the flanges to a second surface of the winding base at the side of the winding base in the first direction. Therefore, a wire wound around the core extends from the winding base to each of the protrusions through the inclined surface. The portion of the wire drawn on the inclined surface does not float in the air. Therefore, when a wire-wound electronic component using the core according to the first embodiment is mounted on a circuit board, if a foreign object is stuck between one of the flanges and the circuit board, it is less likely that the wire is pushed and bent greatly by the foreign object. Thus, the risk of wire disconnection can be diminished.

DETAILED DESCRIPTION

Structure of Wire-Wound Electronic Component

Figure 1:
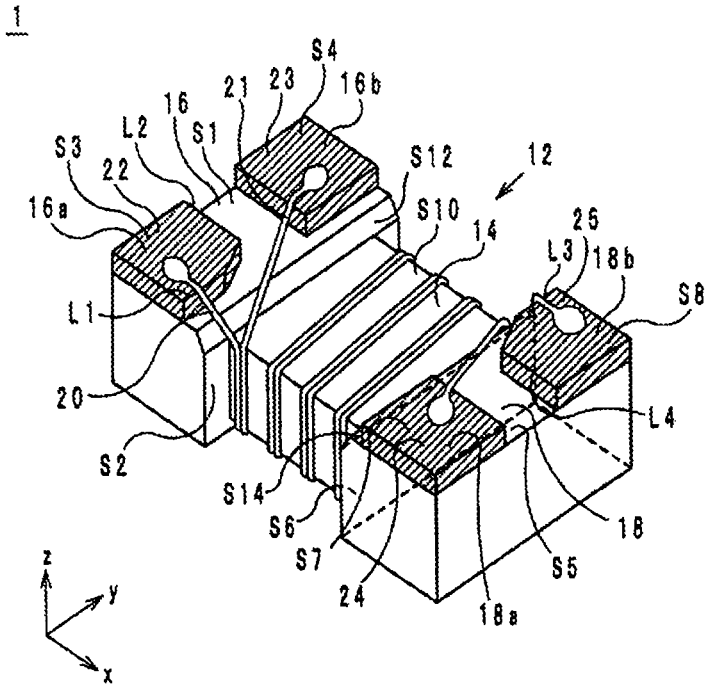
FIG. 1 is a perspective view of a wire-wound electronic component according to an embodiment of the present disclosure.

See FIG. 1

A wire-wound electronic component 1 according to an embodiment of the present disclosure is described with reference to the drawings. In the following paragraphs, a direction in which a winding base extends is referred to as an x-direction. When viewed from the x-direction, a direction parallel to longer sides of a flange 16 is referred to as a y-direction, and a direction parallel to shorter sides of the flange 16 is referred to as a z-direction. The x-direction, y-direction and z-direction are perpendicular to one another.

The wire-wound electronic component 1, as shown in FIG. 1, comprises a core 12, wires 20 and 21, and external electrodes 22 through 25.

The core 12 is formed from a magnetic material, for example, ferrite or the like, or an insulating material, for example, alumina or the like. The core 12 comprises a winding base 14, and flanges 16 and 18.

The winding base 14 is a prismatic member extending in the x-direction. However, the winding base 14 does not need to be prismatic, and may be cylindrical.

The flanges 16 and 18 are located at both ends of the winding base 14 in the x-direction (in the extending direction of the winding base 14). Specifically, the flange 16 is located at a negative side of the winding base 14 in the x-direction. The flange 18 is located at a positive side of the winding base 14 in the x-direction.

The flange 16 protrudes from the winding base 14 at least in a positive z-direction. In this embodiment, the flange 16 protrudes from the winding base 14 in both the positive and negative z-directions and in both the positive and negative y-directions. Accordingly, the flange 16 protrudes from the winding base 14 in all the directions perpendicular to the x-direction. An inclined surface S12 is provided to extend from a surface S1 of the flange 16 at the positive side in the z-direction to a surface S10 of the winding base 14 at the positive side in the z-direction. The inclined surface S12 is a plane, and the inclined surface S12 and the surface S10 are at an obtuse angle to each other when viewed from the y-direction. Accordingly, a vector normal to the inclined surface S12 has a component in the positive x-direction and a component in the positive z-direction.

On the surface S1, protrusions 16a and 16b are arranged in this order from the negative side to the positive side in the y-direction. The protrusions 16a and 16b are spaced from each other so as not to contact with each other. When viewed from the z-direction, the protrusion 16a is substantially rectangular and has a chamfered corner at an intersection between a side L1 at the positive side in the x-direction and a side L2 at the positive side in the y-direction. A surface S3 of the protrusion 16a at the positive side in the z-direction is a plane. When viewed from the z-direction, the protrusion 16b is rectangular, and a surface S4 of the protrusion 16b at the positive side in the z-direction is a plane.

The flange 18 protrudes from the winding base 14 at least in the positive z-direction. In this embodiment, the flange 18 protrudes from the winding base 14 in both the positive and negative z-directions and in both the positive and negative y-directions. Accordingly, the flange 18 protrudes from the winding base 14 in all the directions perpendicular to the x-direction. An inclined surface S14 is provided to extend from a surface S5 of the flange 18 at the positive side in the z-direction to a surface S10 of the winding base 14 at the positive side in the z-direction. The inclined surface S14 is a plane, and the inclined surface S14 and the surface S10 are at an obtuse angle to each other when viewed from the y-direction. Accordingly, a vector normal to the inclined surface S14 has a component in the negative x-direction and a component in the positive z-direction.

On the surface S5, protrusions 18a and 18b are arranged in this order from the negative side to the positive side in the y-direction. The protrusions 18a and 18b are spaced from each other so as not to contact with each other. When viewed from the z-direction, the protrusion 18a is rectangular, and a surface S7 of the protrusion 18a at the positive side in the z-direction is a plane. The protrusion 18b is substantially rectangular, and the protrusion 18b has a chamfered corner at an intersection between a side L3 at the negative side in the x-direction and a side L4 at the negative side in the y-direction. A surface S8 of the protrusion 18b at the positive side in the z-direction is a plane.

The flanges 16 and 18 are symmetric with each other about a line extending in the z-direction and passing through the center of the winding base 14. When the wire-wound electronic component 1 is mounted on a circuit board, the surfaces S3, S4, S7 and S8 of the protrusions 16a, 16b, 18a and 18b serve as mounting surfaces to face the circuit board.

The external electrodes 22 through 25 are formed of a Ni-based alloy (for example, Ni—Cr, Ni—Cu, Ni or the like), Ag, Cu, Sn or the like. The external electrode 22 is provided to extend across the surface S3 of the protrusion 16a and the surroundings thereof. The external electrode 23 is provided to extend across the surface S4 of the protrusion 16b and the surroundings thereof. The external electrode 24 is provided to extend across the surface S7 of the protrusion 18a and the surroundings thereof. The external electrode 25 is provided to extend across the surface S8 of the protrusion 18b and the surroundings thereof.

The wires 20 and 21 are, as shown in FIG. 1, conductive wires wound around the winding base 14. Each of the wires 20 and 21 has a core, which is formed mainly of a conductive material such as copper, silver or the like, coated with an insulating material such as polyurethane or the like.

The negative end in the x-direction of the wire 20 is connected to the external electrode 22 on the surface S3, and the positive end in the x-direction of the wire 20 is connected to the external electrode 24 on the surface S7. The negative end portion in the x-direction of the wire 20 is drawn on the inclined surface S12 in the negative x-direction and led to the surface S3 over the side L1. The positive end portion in the x-direction of the wire 20 is drawn on the inclined surface S14 in the positive x-direction and in the negative y-direction and led to the surface S7 over a side of the protrusion 18a at the positive side in the y-direction.

The negative end in the x-direction of the wire 21 is connected to the external electrode 23 on the surface S4, and the positive end in the x-direction of the wire 21 is connected to the external electrode 25 on the surface S8. The negative end portion in the x-direction of the wire 21 is drawn on the inclined surface S12 in the negative x-direction and in the positive y-direction and led to the surface S4 over a side of the protrusion 16b at the negative side in the y-direction. The positive end portion in the x-direction of the wire 21 is drawn on the inclined surface S14 in the positive x-direction and led to the surface S8 over the side L3.

Function of Wire-Wound Electronic Component

The wire-wound electronic component 1 having the structure above functions as follows.

In the wire-wound electronic component 1, the wires 20 and 21 are wound side by side on the same winding axis. Therefore, a magnetic flux induced by an electric current flowing in the wire 20 passes through the wire 21, and a magnetic flux induced by an electric current flowing in the wire 21 passes through the wire 20.

At this time, when common-mode electric currents flow in the wires 20 and 21, the magnetic fluxes induced thereby are in the same direction. Therefore, the magnetic fluxes induced on the wires 20 and 21 are reinforced by each other, and impedance to the common mode electric currents occurs.

On the other hand, when normal-mode electric currents flow in the wires 20 and 21, the magnetic fluxes induced thereby are the opposite direction to each other. Therefore, no impedance to the normal-mode electric currents occurs. Thus, the wire-wound electronic component 1 functions as a common mode choke coil.

Method for Manufacturing Wire-Wound Electronic Component

Next, a method for manufacturing the wire-wound electronic component according to the embodiment is described.

First, as a material for the core 12, powder of a ferrite-based material is prepared. The prepared ferrite powder is filled in a female die, and the powder filled in the female die is pressed with a male die. Thereby, the powder is molded into the core 12 having the winding base 14, and the flanges 16 and 18.

After the molding of the core 12 having the winding base 14, and the flanges 16 and 18, the core 12 is sintered, whereby the core 12 is completed.

Next, the external electrodes 22 through 25 are formed on the protrusions 16a, 16b, 18a and 18b of the flanges 16 and 18 of the core 12. More specifically, in a container filled with Ag paste, the protrusions 16a, 16b, 18a and 18b are dipped so that the Ag paste can stick to the protrusions 16a, 16b, 18a and 18b. Next, the Ag paste stuck on the protrusions 16a, 16b, 18a and 18b is dried and baked, whereby Ag films are formed on the protrusions 16a, 16b, 18a and 18b as base electrodes. Further, a metal film, for example, formed from a Ni-based alloy is formed on each of the Ag films by electroplating or the like. In this way, the external electrodes 22 through 25 are formed.

Next, the wires 20 and 21 are wound around the winding base 14. In this moment, both ends of a predetermined length of each of the wires 20 and 21 are led out from the winding base 14. The led-out portions of the wires 20 and 21 are connected to the external electrodes 22 through 25 by thermocompression bonding. Through the processes above, the electronic component 1 is completed.

Advantageous Effects

Figure 2:
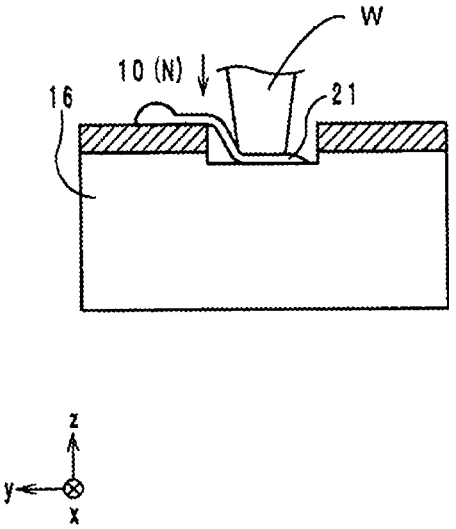
FIG. 2 is a view showing a test conducted on the wire-wound electronic component.

See FIGS. 1 and 2

In the wire-wound electronic component 1, the end portion of the wire 21 in the negative x-direction, when viewed from the positive side in the z-direction, extends in the positive y-direction across the space between the protrusions 16a and 16b. The end of the wire 21 in the negative x-direction is connected to the external electrode 23 on the surface S4. In this regard, since the core 12 of the wire-wound electronic component 1 has the inclined surface S12, the end portion of the wire 21 in the negative x-direction extends on the inclined surface S12 to the surface S4. Accordingly, the portion of the wire 21 extending on the inclined surface S12 does not float in the air. When the wire-wound electronic component 1 is mounted on a circuit board, therefore, if a foreign object is stuck between the flange 16 and the circuit board, it is less likely that the end portion of the wire 21 in the negative x-direction is pushed and bent greatly by the foreign object. Thus, the risk of wire disconnection can be diminished. With regard to the end portion of the wire 20 in the positive x-direction, the provision of the inclined surface S14 diminishes the risk of wire disconnection for the same reason.

In order to prove the advantageous effect above, the inventors simulated a situation where a foreign object is stuck between one of the flanges of the wire-wound electronic component and a circuit board. Specifically, samples of the wire-wound electronic component 1 were used as samples of Type 1, and wire-wound electronic components each using a core having the structure disclosed by Japanese Patent Laid-Open Publication No. H11-204346 were used as samples of Type 2. A simulated test was conducted on each of the samples. Specifically, as shown by FIG. 2, the flange 16 was loaded with 10 (N) for one minute with the wound wire located between the flange 16 and the weight W. In each of the samples of Type 1 and Type 2, the wires have diameters of 30 μm. The simulated test was conducted on fifty samples of Type 1 and fifty samples of Type 2.

As a result, no samples of Type 1 had wire disconnection, while 44 samples of Type 2 had wire disconnection. This result proves that the wire-wound electronic component 1 has an advantageous effect of diminishing the risk of wire disconnection.

Further, the external electrodes 22 and 23 are provided respectively on the protrusions 16a and 16b provided on the surface S1 of the flange 16, and the external electrodes 24 and 25 are provided respectively on the protrusions 18a and 18b provided on the surface S5 of the flange 18. Thus, the external electrodes 22 through 25 are separated from one another. Therefore, the electric current flowing in the wire 20 and the electric current flowing in the wire 21 are prevented from crossing, and the risk of crosstalk can be diminished.

Modification

Figure 3:
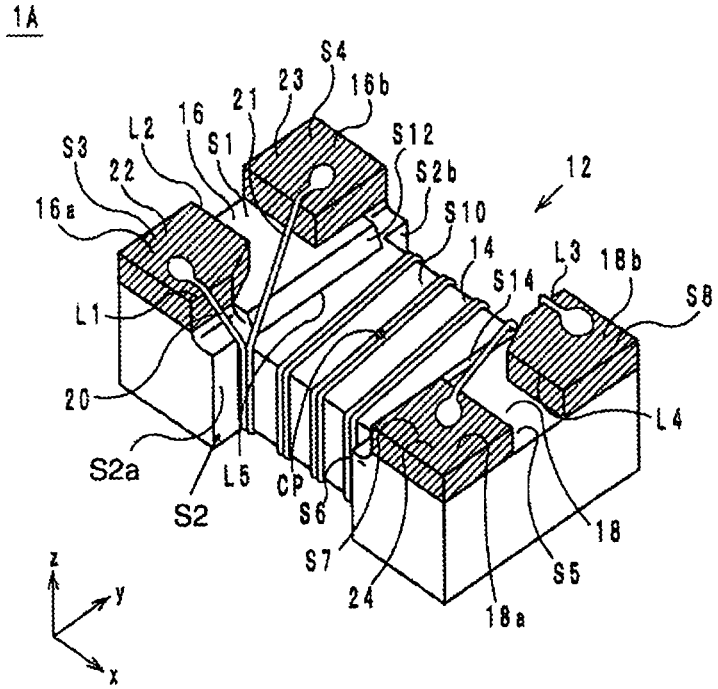
FIG. 3 is a perspective view of a wire-wound electronic component according to a modification.

See FIG. 3

A wire-wound electronic component 1A is, as shown in FIG. 3, different from the wire-wound electronic component 1 in the shapes of the flanges 16 and 18.

Specifically, in the wire-wound electronic component 1A, with regard to a surface S2 of the flange 16 in contact with the winding base 14, as shown in FIG. 3, portions S2a and S2b protruding from the winding base 14 in the y-direction are located at a more negative side in the x-direction than a line of intersection L5 between the inclined surface S12 and the surface S10. In other words, the portions S2a and S2b of the surface S2 are located farther in the x-direction from a center point CP of the winding base 14 than the line of intersection L5.

Also, with regard to a surface S6 of the flange 18 in contact with the winding base 14, portions protruding from the winding base 14 in the positive and negative y-directions are located farther in the x-direction from the center point CP of the winding base 14 than a line of intersection between the inclined surface S14 and the surface S10. There is no other difference in structure between the wire-wound electronic component 1A and the wire-wound electronic component 1. Accordingly, the descriptions of the elements of the wire-wound electronic component 1 other than the descriptions of the flanges 16 and 18 apply to the wire-wound electronic component 1A.

In the electronic component 1A according to the modification, the portions S2a and S2b of the surface S2 protruding from the winding base 14 in the positive and negative y-directions are located at a more negative side in the x-direction than the line of intersection L5. Therefore, the winding base 14 of the electronic component 1A has a larger surface area than that of the electronic component 1. Thus, in the wire-wound electronic component 1A, the area to be wound with the wires 20 and 21 is increased, and the adjustment of inductance value is easy compared with the wire-wound electronic component 1.

Other Embodiments

Cores for wire-wound electronic components, wire-wound electronic components and common mode choke coils according to the present disclosure are not limited to the embodiment and modification above.

In the embodiment and modification above, the inclined surfaces S12 and S14 are planes. However, the inclined surfaces S12 and S14 may be curved surfaces. Specifically, the inclined surfaces S12 and S14 may be convex surfaces protruding in the positive z-direction or may be concave surfaces receding in the negative z-direction.

Although the present disclosure has been described in connection with the preferred embodiments above, it is to be noted that various changes and modifications may be obvious to persons skilled in the art. Such changes and modifications are to be understood as being within the scope of the disclosure.

What is claimed is:

[1. A core for a wire-wound electronic component, the core comprising:

a winding base to be wound with a wire; and flanges located at both ends of the winding base in an extending direction of the winding base and protruding from the winding base in a first direction perpendicular to the extending direction, each of the flanges having a plurality of protrusions on a first surface at a side of the flange in the first direction, and an inclined surface formed on the first surface of each of the flanges, in an area extending from a space between the plurality of protrusions to a second surface of the winding base at a side of the winding base in the first direction, so as to be inclined to the second surface.]

[2. The core according to claim 1, wherein the inclined surface and the second surface are at an obtuse angle to each other when viewed from a second direction perpendicular to the first direction and the extending direction.]

[3. The core according to claim 2, wherein a third surface of each of the flanges in contact with the winding base includes a portion protruding from the winding base in the second direction; and wherein the portion of the third surface protruding from the winding base in the second direction is located farther in the extending direction from a center of the winding base than a line of intersection between the inclined surface and the second surface.]

[4. The core according to claim 1 through 3, wherein the plurality of protrusions are arranged in the second direction at intervals.]

[5. A wire-wound electronic component comprising:

a core according to claim 1;

a wire; and external electrodes provided on the respective protrusions, wherein the wire extends on the inclined surface.]

[6. A common mode choke coil comprising:

a core according to claim 1;

a wire; and external electrodes provided on the respective protrusions, wherein the wire extends on the inclined surface.]

*7. A core for a wire-wound electronic component, the core comprising:*

*a winding base to be wound with a wire;*

*flanges located at both ends of the winding base in an extending direction of the winding base and protruding from the winding base in a first direction perpendicular to the extending direction, at least one of the flanges having a first protrusion and a second protrusion on a first surface at a side of the flange in the first direction, the first protrusion and the second protrusion being arranged with a space therebetween in a second direction perpendicular to the first direction and the extending direction; and*

*an inclined surface extending from the first surface to a part of a second surface of the winding base, the second surface being located at a side of the winding base in the first direction, wherein*

*with respect to the extending direction, the first surface lies between the inclined surface and the first and the second protrusions, such that the inclined surface does not contact the first and second protrusions, and*

*the inclined surface and the second surface are at an obtuse angle to each other when viewed from the second direction perpendicular to the first direction and the extending direction.*

*8. The core according to claim 7, wherein*

*when viewed from the first direction, one of the first protrusion and the second protrusion for each flange is substantially rectangular and has a chamfered corner at an intersection between a side facing the winding base and a side facing another of the first protrusion and the second protrusion of the same flange.*

*9. The core according to claim 7, wherein*

*a third surface of each of the flanges in contact with the winding base includes a portion protruding from the winding base in the second direction; and*

*wherein the portion of the third surface protruding from the winding base in the second direction is located farther in the extending direction from a center of the winding base than a line of intersection between the inclined surface and the second surface.*

*10. The core according to claim 7, wherein the first protrusion and the second protrusion are arranged in the second direction at intervals.*

*11. A common mode choke coil comprising:*

*the core according to claim 7;*

*the wire; and*

*external electrodes provided on the respective protrusions, wherein the wire extends on the inclined surface.*

*12. The common mode choke coil of claim 11, wherein for each flange there is a non-chamfered protrusion and a chamfered protrusion, and wherein the wire extends from an electrode of the non-chamfered protrusion to a position between the chamfered corner of the chamfered protrusion and the winding base before making contact with the winding base.*

*13. A wire-wound electronic component comprising:*

*a core for the wire-wound electronic component, the core comprising:*

*a winding base to be wound with a wire;*

*flanges located at both ends of the winding base in an extending direction of the winding base and protruding from the winding base in a first direction perpendicular to the extending direction, at least one of the flanges having a first protrusion and a second protrusion on a first surface at a side of the flange in the first direction, the first protrusion and the second protrusion being arranged with a space therebetween in a second direction perpendicular to the first direction and the extending direction; and*

*an inclined surface extending from the first surface to a part of a second surface of the winding base, the second surface being located at a side of the winding base in the first direction, wherein*

*with respect to the extending direction, the first surface lies between the inclined surface and the first and the second protrusions, such that the inclined surface does not contact the first and second protrusions,*

*the wire; and*

*external electrodes provided on the respective protrusions, wherein the wire extends on the inclined surface.*

*14. The wire-wound electronic component of claim 13, wherein for each flange there is a non-chamfered protrusion and a chamfered protrusion, and wherein the wire extends from an electrode of the non-chamfered protrusion to a position between the chamfered corner of the chamfered protrusion and the winding base before making contact with the winding base.*

* * * * *